United States Patent [19]

Seibicke

[11] 4,259,624
[45] Mar. 31, 1981

[54] ARRANGEMENT FOR WIPING A VEHICLE WINDOW

[75] Inventor: Horst Seibicke, Bühl-Altschweier, Fed. Rep. of Germany

[73] Assignee: Robert Bosch GmbH, Stuttgart, Fed. Rep. of Germany

[21] Appl. No.: 970,433

[22] Filed: Dec. 18, 1978

[30] Foreign Application Priority Data

Jan. 26, 1978 [DE] Fed. Rep. of Germany ....... 2803264

[51] Int. Cl.³ ............................................. H02P 1/02
[52] U.S. Cl. ..................................... 318/282; 318/443; 318/DIG. 2
[58] Field of Search ............... 318/281, 282, 443, 444, 318/DIG. 2

[56] References Cited

U.S. PATENT DOCUMENTS

| | | | |
|---|---|---|---|
| 3,145,407 | 8/1964 | Page et al. | 318/282 |
| 3,389,320 | 6/1968 | Ziegler | 318/443 |
| 3,675,103 | 7/1972 | Elliott | 318/281 |
| 3,689,817 | 9/1972 | Elliott | 318/443 |

Primary Examiner—Gene Z. Rubinson
Assistant Examiner—John W. Redman
Attorney, Agent, or Firm—Michael J. Striker

[57] ABSTRACT

An arrangement for wiping a vehicle window has a wiping element adapted to rotate through a predetermined wiping angle, an electric motor having a rotatable output shaft which is connected with the wiping element so as to rotate the same, and a switching device operative for reversing the direction of rotation of the electric motor when the wiping element reaches the ends of the wiping angle. The wiping element may be mounted on the output shaft of the motor or on an output shaft of a reduction transmission between the electric motor and the wiping element. The switching device may include a direction-reversing switch whose contacts are introduced in the electric circuit of the electric motor, and two switch-actuating pins mounted on an output gear which is fitted on the output shaft. One of the switch-actuating pins may be displaceable relative to the other so that the wiping angle through which the wiping element rotates, can be adjusted.

10 Claims, 5 Drawing Figures

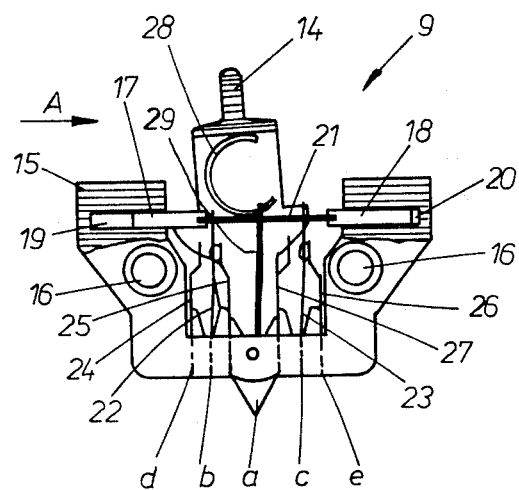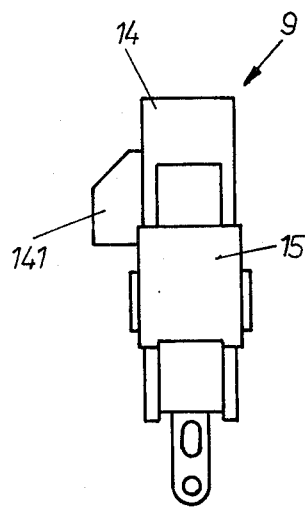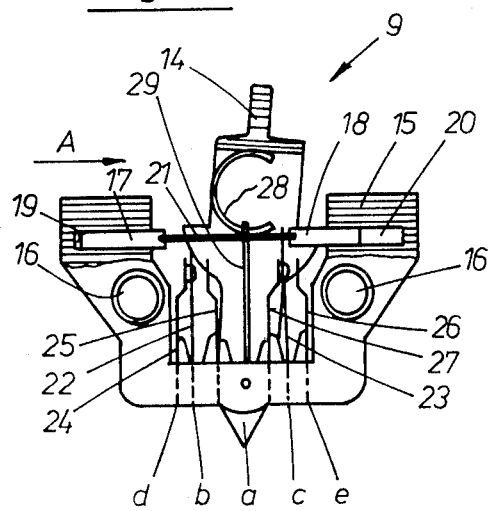

ARRANGEMENT FOR WIPING A VEHICLE WINDOW

BACKGROUND OF THE INVENTION

The present invention relates to an arrangement for wiping a vehicle window, including a wiping element which rotates through a certain angle, and an electric motor operative for rotating the wiping element.

Wiping arrangements of this general type are known in the art. In a known wiping arrangement, a linkage is provided between the electric motor or a transmission, on the one hand, and the wiping element, on the other hand. This linkage converts the rotation of the electric motor or transmission gears into the reciprocating pendulum motion of the wiping element. The linkage provides for a possibility to displace the wiping element through a wiping angle approximating 180°. However, in order to attain an angle which is actually equal to 180°, high structural expenditures for motion-transmitting structure are necessary. In any case, linkages or similar transmission means for converting a rotational motion into a pendulum motion require not only considerable space for their accommodation, but also reduce the efficiency of the wiping arrangement.

SUMMARY OF THE INVENTION

Accordingly, it is an object of the present invention to provide an arrangement for wiping a vehicle window, which avoids the disadvantages of the prior art.

More particularly, it is an object of the present invention to provide an arrangement for wiping a vehicle window, which has an improved efficiency and occupies a smaller space, as well as has smaller installation dimensions and weight, as compared with the known arrangements.

In keeping with these objects and with others which will become apparent hereinafter, one feature of the present invention resides, briefly stated, in that a wiping element is fixedly mounted on an output shaft of an electric motor or a transmission, so as to be rotated through a predetermined wiping angle, and a switching device is provided for reversing the direction of rotation of the electric motor at the ends of the wiping angle. In such a construction, the wiping element performs pendulum motion, but no additional pendulum linkage is necessary. Since such pendulum linkage generally consumes about 50% of the arrangement's efficiency, therefore in the present construction where this linkage is dropped, the same torque on the output shaft can be generated by the motor which is by 50% smaller than the motors utilized in the arrangements provided with the above-mentioned pendulum linkage. This results not only in the improvement of the efficiency of the arrangement, but also in the reduction of the dimensions and weight of the arrangement, inasmuch as the dimensions of the electric motor are decreased and the pendulum linkage is dropped. Therefore, the arrangement has small installation dimensions which is very important for mounting the arrangement on a vehicle. Moreover, the wiping arrangement in accordance with the invention is simple and inexpensive to manufacture. Finally, any desirable wiping angle from 30° to 360° can be attained in the arrangement, whereas the driving torques remain identical with any of the angles in the above-mentioned range.

In accordance with another advantageous feature of the present invention, the switching device has a direction-reversing switch having contacts which are introduced in an electric circuit of the motor, and two switch-actuating pins which are spaced from one another at a distance corresponding to the wiping angle. The pins are connected with an output gear which is fitted on the output shaft of the transmission, such as a reduction transmission.

The connection of the switching device with the transmission, or reduction transmission, and control of the switching device by the same, provide for a compact, on the one hand, and relatively simple, on the other hand, construction of the switching device. The synchronism between the position of the wiping element fixedly connected with the output shaft and the operation of the switching device is automatically guaranteed, without an additional step of sensing the position of the wiping element. The distance between the switch-actuating pins may be easily changed so that the angle of rotation which depends on this distance is also changed, and the wiping angle can be easily adjusted in the range between 30° and 360°. With each of the wiping angles, the driving torque remains identical.

In accordance with still another feature of the present invention, the switch-actuating pins are mounted directly on the output gear of the transmission. Thus, the output gear and the switch-actuating pins can be manufactured in one step, for instance by an injection-molding process.

In accordance with yet another feature of the present invention, the output gear may be provided with a plurality of holes which are spaced from each other in a circumferential direction, and at least one of the switch-actuating pins can be inserted into any of the holes, as required. The other switch-actuating pin which, in the normal position of the wiping element and the output gear, actuates the direction-reversing switch, can be fixedly mounted on the output gear. By inserting the first-mentioned switch-actuating pin in the respective holes of the output gear, the distance between the switch-actuating pins and thereby the wiping angle can be adjusted. This construction is especially advantageous for mass production of the wiping arrangements, because different angles can be attained in the wiping arrangement in dependence upon the consumer requirements. All arrangements can be manufactured identically up to the final assemblage. Then by inserting the removable switch-actuating pin into a respective hole, the desired wiping angle is established in each arrangement.

A further feature of the present invention is that the output gear of the transmission is formed as a spoked wheel with elastic spokes. Preferably, the spokes and the remainder portion of the wheel are constituted by a synthetic plastic material and are of one piece with one another. Thereby, the abrupt reverses of the direction of rotation of the electric motor are elastically taken up so as to assure jerkless and uniform movement of the wiping element. In this construction noise generated during mechanical switching is also suppressed.

Still a further feature of the present invention is that the direction-reversing switch is mounted on the housing of the transmission and has a switching cam which extends into a path of rotation of the switch-actuating pins. Thereby, the switching device has a compact construction, on the one hand, and the direction-reversing switch which is subjected to wear during repeated switching, can be easily replaced by a new one.

In accordance with an additional feature of the present invention, the switching cam is provided with two guiding pins which are located diametrically opposite to one another in the switching direction and move in blind holes substantially without play. In this construction the noise generated during striking contact is further suppressed. When the direction-reversing switch is switched over, one of the guiding pins is inserted into one of the blind holes, and air accommodated in the latter is compressed. This results in that the contact elements of the direction-reversing switch contact their opposite contact elements very softly, and thereby the noise which is usually generated during switching is not heard.

In accordance with still an additional feature of the present invention, the arrangement includes a wiping end switch having a contact disc mounted on the output shaft and provided with a contact track including an insulated recess, and two sliding contact elements which are in contact with the contact track and one of which runs in the recess when the wiping element and the contact disc are in the normal position. The contact track extends through an angle corresponding to the angle between the switch-actuating pins. Thereby the usually required parking position of the wiping element is attained in simple manner.

Yet an additional feature of the present invention is that one of the switch-actuating pins is so located that in the normal position of the wiping element and the contact disc it engages with the switching cam of the direction-reversing switch. Thereby, in the normal position of the wiping element, the direction-reversing switch is actuated, whereby it is guaranteed that when the wiping arrangement is switched on, the electric motor runs in the right direction so that the sliding contacts move lengthwise of the contact track of the contact disc.

When it is necessary to provide the wiping angle equal to 360°, then the contact track of the contact disc must extend through an angle of 360°. One of the switch-actuating pins exactly determines the normal position of the wiping element and the contact disc, whereas the other switch-actuating pin can be located on the output gear of the transmission or on the contact disc at such a distance from the first-mentioned pin that a required wiping angle of the wiping element is attained. When the wiping angle is equal to 360°, the contact track extends in a circumferential direction over the whole contact disc, whereas when the wiping angle is smaller the contact disc extends over a part of the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 2 and 3 are views showing a direction-reversing switch of the arrangement in two possible positions, with a partially sectioned switch casing;

FIG. 4 is a view taken in the direction of arrow A in FIGS. 2 and 3; and

DESCRIPTION OF THE PREFERRED EMBODIMENTS

Figure 1:
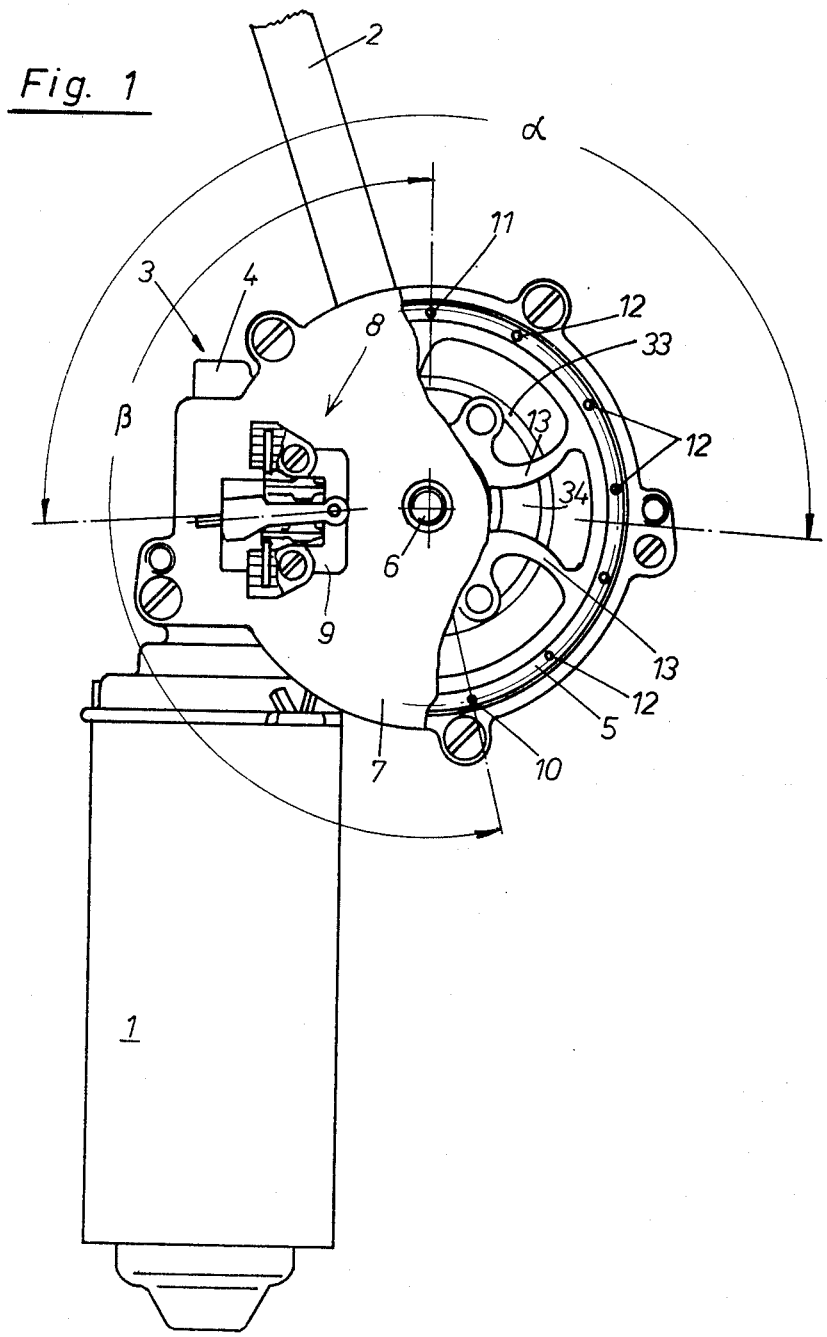
FIG. 1 is a partially sectioned side view of an arrangement for wiping a vehicle window, in accordance with the present invention.

An arrangement for wiping a window of a vehicle, particularly a car, is shown in FIG. 1 and has an electric motor 1, and a wiping arm 2 which is rotated by the electric motor 1 by a wiping angle $\alpha$. A reduction transmission 3 is provided between the electric motor 1 and the wiping arm 2. The reduction transmission 3 includes a worm which is fitted on an output shaft 4 of the electric motor 1, and a worm gear 5 which meshes with the worm and forms an output gear of the reduction transmission 3. The worm is not shown in the drawing.

The worm gear 5 is fixedly mounted on an output shaft 6 of the reduction transmission 3 for joint rotation therewith. The reduction transmission 3 is accommodated in a housing 7 which is partially sectioned in FIG. 1 so that the worm gear 5 forming the output gear of the reduction transmission 3 is partially visible. A switching device 8 is further provided, operative for reversing the polarity of the electric motor 1 at a respective end of the wiping angle $\alpha$ so that the direction of rotation of the electric motor 1 is reversed.

The switching device 8 has a direction-reversing switch 9 whose contacts are introduced in an electric circuit of the electric motor 1. The operation of these contacts will be explained hereinbelow. The switching device further includes two pins 10 and 11 which actuate the direction-reversing switch 9 and are spaced from one another by an angle of rotation $\beta$ substantially corresponding to the above-mentioned wiping angle $\alpha$. The switch-actuating pins 10 and 11 are connected with the output worm gear 5 which, in turn, is fixedly connected and jointly rotates with the output shaft 6 of the reduction transmission 3. In accordance with the embodiment shown in FIG. 1, the switch-actuating pins 10 and 11 are mounted directly on the worm gear 5.

The worm gear 5 is provided with a plurality of holes 12 which are spaced from each other in a circumferential direction and each arranged to receive at least one of the pins 10 and 11. The switch-actuating pin 10 is fixedly mounted on the worm gear 5, whereas the switch-actuating pin 11 can be inserted in one of the holes 12 in accordance with a desired angle $\alpha$. As shown in FIG. 1, the angle of rotation $\beta$ between the switch-actuating pins 10 and 11 somewhat exceeds 180°, whereby the wiping angle is substantially equal to 180°.

The worm gear 5 forming the output gear of the reduction transmission 3 is formed as a spoked wheel with elastic spokes 13. The wheel and the spokes 13 are of one piece with each other and constituted by a synthetic plastic material. The spokes 13 are preferably so constructed that they have an identical degree of elasticity so as to identically respond to loads. In the thus-constructed worm gear 5 the spokes 13 possess shock-absorbing properties, whereby the abrupt reverse of the direction of rotation of the electric motor 1 is elastically taken up.

The direction-reversing switch 9 is mounted in the housing 7 of the reduction transmission 3 and carries a switch cam 14 which is shown in FIG. 4 in detail and has a projection 141 extending into a circular path of the switch-actuating pins 10 and 11. The direction-reversing switch 9 has a housing 15 which is provided with bores 16 for mounting the direction-reversing switch 9 on the housing 7 of the reduction transmission 3 as shown in FIGS. 2 and 3. The switch cam 14 is connected with two pins 17 and 18 which are located diametrically opposite to one another in the switching direction of the direction reversing switch 9. The pins 17 and 18 move in blind bores 19 and 20 of the housing 15 substantially without play. The switch cam 14 is connected with the pins 17 and 18 by a holding plate 21.

The direction-reversing switch 9 has two movable contact elements 22 and 23 each of which is located between a pair of immovable contact elements 24 and 25 or 26 and 27, respectively. The both movable contact elements are connected with the holding plate 21. When the switch cam 14 moves, the movable contact elements 22 and 23 are moved away from the immovable contact elements 25 and 26 (FIG. 2) and are brought into contact with the immovable contact elements 24 and 27 (FIG. 3), respectively. The switch cam 14 is provided with a C-shaped spring 28 which cooperates with an elastic member 29 so that the direction-reversing switch 9 is bistable and is retained in one of its positions until it assumes its other also stable position under the action of one of the switch-actuating pins 10 and 11.

During switching the switch cam 14, one of the pins 17 and 18 moves into the blind bore 19 or 20, whereas the other pin moves out of the same. When the pins 17 and 18 alternately move into the blind bores 19 and 20 substantially without play, air which is accommodated in the blind bores is compressed so that the movable contact elements 22 and 23 touch the immovable contact elements 24 and 25 or 26 and 27 very softly. Thereby, the noise generated by switching is considerably suppressed.

In an arrangement for wiping a vehicle window a wiper arm limit switch is required. This limit switch operates to always stop the wiping arm 2 in its normal or parking position independently from the point of time of switching off of the wiping arrangement. Such a limit switch is identified by reference numeral 30 and includes sliding contacts 31 and 32 which are introduced in a current circuit of the electric motor 1, and a rotatable contact disc 33 provided with a contact track 34 wherein the sliding contacts 31 and 32 are supported. In the inventive arrangement, the contact disc 33 is fixedly mounted on the output shaft 6 of the reduction transmission 3 so that, the contact disc 33 is connected with the rotational movement of the worm gear 5 and the switch-actuating pins 10 and 11 mounted on the latter.

A portion of the contact disc 33 with the contact track 34 is shown in FIG. 1. The contact track extends by a distance which at least corresponds to the angle $\beta$. In FIG. 1 the contact track extends through substantially 360° since, as explained hereinabove, the wiping angle $\alpha$ can be equal up to 360°. The angle $\alpha$ equal to 360° can be attained by respective displacement of the switch-actuating pin 11 up to the region of the switch-actuating pin 10 for increasing the angle of rotation $\beta$. If one wishes to attain the wiping angle $\alpha$ equal to approximately 180° shown in FIG. 1, it will suffice to provide such a contact track 34 which extends from the switch-actuating pin 10 and terminates immediately behind the switch-actuating pin 11.

Figure 5:
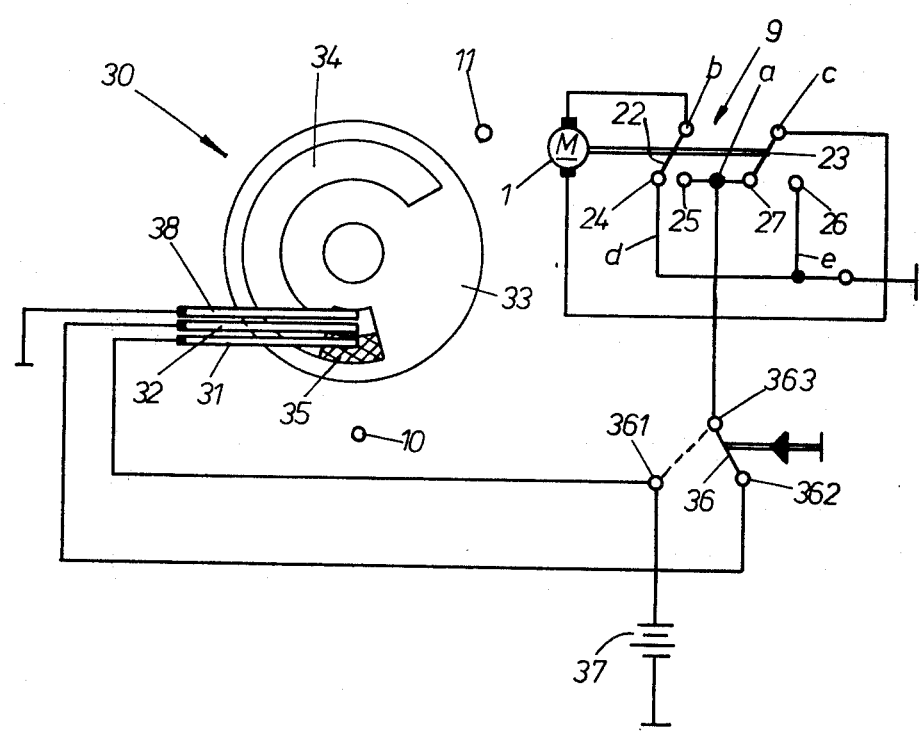
FIG. 5 is an electrical switching diagram of the arrangement in accordance with the invention.

As can be seen from FIG. 5, the contact track 34 has an insulated recess 35 wherein at least one sliding contact 31 runs in the normal position of the wiping arm 2 and the contact disc 33. The contact disc 33 is shown in FIG. 5 in its normal position. The switch-actuating pin 10 is so located that in the normal position of the wiper arm 2 and the contact disc 33 it engages with the switch cam 14 of the direction-reversing switch 9. Thereby in the normal position the direction-reversing switch 9 is actuated and the electric motor 1 runs by switching the wiring arrangement in the right direction, whereby the sliding contacts 31 and 32 move along the contact track 34.

The electrical switching diagram of the wiping arrangement is shown in FIG. 5. A known ON-OFF switch 36 can connect the wiping arrangement with the positive pole of a vehicle battery 37. The input of the ON-OFF or wiping switch 36 is connected with a terminal a of the direction-reversing switch 9 (compare FIGS. 2 and 3). The immovable contact elements 25 and 27 are also connected with the terminal a. The movable contact element 22 is connected through a terminal b of the direction-reversing switch 9 with one terminal of the electric motor 1, and the movable contact element 23 is connected through a terminal c of the direction-reversing switch with the other terminal of the electric motor 1. The immovable contact element 24 is connected through a terminal d of the direction-reversing switch 9, and the immovable contact element 26 is connected through a terminal e of the direction-reversing switch 9 with the negative pole of the vehicle battery 37 or with mass.

The ON-OFF switch 36 has two outputs 361 and 362 which can be alternately connected with an input 363 connected with the terminal a of the direction-reversing switch. As already mentioned, the output 361 is connected with the positive pole of the vehicle battery 37. In addition to this, the sliding contact 31 is connected with the output 361 of the ON-OFF switch 36. The second output 362 of the ON-OFF switch 36 is connected with the sliding contact 32. An additional sliding contact 38 serves for short-circuiting of the electric motor 1 in the normal position of the contact disc 33. This sliding contact 38 runs only in the normal position of the contact disc 33 on the contact track 34 and short-circuits the electric motor through the sliding contacts 38 and 32.

When the ON-OFF switch 36, which is shown in FIG. 5 in the switched-off position, is switched over, then the vehicle battery 37 is connected with the terminal a of the direction-reversing switch 9. The switching position of the direction-reversing switch 9 shown in FIG. 5 corresponds to its switching position in the normal position of the wiper arm 2 or the contact disc 33, and is identical to the switching position of the direction-reversing switch shown in FIG. 3. A current flows from the positive pole of the vehicle battery 37 through the ON-OFF switch 36, through the immovable contact element 27, the movable contact element 23 to the electric motor 1 and from there through the movable contact element 22 and the immovable contact element 24 to the mass. The electric motor 1 rotates in counterclockwise direction. The rotation of the electric motor 1 is transmitted through the output shaft 4 and the worm to the worm gear 5. The worm gear 5 rotates, in turn, the output shaft 6 of the reduction transmission 3 whereon the wiper arm 2 is mounted. The wiper arm 2 is thereby turned.

Since the contact disc 33 is also fixedly connected to the output shaft 6 of the reduction transmission 3, the contact disc 33 will be turned in the counterclockwise direction to the same extent as the worm gear 5. After insignificant rotation of the contact disc 33 the sliding contact 31 runs on the contact track 34. If in this moment the ON-OFF switch is switched into its off-position shown in FIG. 5, this does not have consequences for the electric motor 1 since in this case the current from the positive pole of the vehicle battery flows through the sliding contacts 31 and 32 in the same above-mentioned direction to the electric motor 1.

When the worm gear 5 runs through a certain angle β the switch-actuating pin 11 abuts against the switch cam 14 of the direction-reversing switch 9 and turns the same into the position shown in FIG. 2. The direction-reversing switch is switched over and the contact element 22–27 assume the position which is shown in FIG. 2. Now the supply current for the electric motor 1 flows from the terminal a of the direction-reversing switch 9 through the immovable contact element 25 and the movable contact element 22 to one of the terminals of the electric motor 1, and from the other terminal of the electric motor 1 through the movable contact 23 and the immovable contact 26 to the mass. It is understood that now the direction of current is reversed so that the electric motor 1 promptly starts to rotate in the opposite direction. This abrupt reverse of the rotation of the electric motor 1 is considerably absorbed and dampened. Now the electric motor rotates in clockwise direction.

The rotation of the output shaft 4 of the electric motor 1 in this direction causes rotation of the worm gear 5 in the same clockwise direction. This is shown in FIG. 1. The contact disc 33 rotates in synchronism with the worm gear 5. When the contact disc 33 reaches its normal position, the sliding contact 31 runs on the insulated recess 35 and the switched-off ON-OFF switch 36 breaks the flow of current to the electric motor 1 so that the latter stops. In this normal position of the contact disc 33 the wiper arm 2, as mentioned hereinabove, is also in its normal or parking position. Simultaneously with running of the contact disc 33 into its normal position, the switch-actuating pin 10 also abuts against the switch cam 14 of the direction-reversing switch 9 and rotates the latter. The direction-reversing switch 9 is again switched over and the polarity of the electric motor 1 is again reversed. When now the ON-OFF switch 36 is switched into its on-position, then the electric motor 1 and thereby the worm gear 5 and the contact disc 33 rotate again in counterclockwise direction. When the ON-OFF switch during running of the contact disc 33 is still in its on-position, then the electric motor 1 again rotates in the counterclockwise direction without interruption. Thus, until the ON-OFF switch 36 remains switched-on, the wiper arm drive continuously operates by permanent reversing of the polarity of the electric motor 1 in correspondence with the rotation of the worm gear 5 through an angle of rotation β. Thereby the wiper arm 2 performs a pendulum motion by the angle α which corresponds to the angle of rotation β.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for wiping a vehicle window, comprising a wiping element adapted to pivot through a predetermined wiping angle; an electric motor having a circuit and a rotatable motor shaft; a transmission driven by said motor shaft and having an output shaft on which said wiping element is mounted; an output gear also mounted on said output shaft of said transmission for joint movement therewith, said output gear having a plurality of holes which are spaced from one another in circumferential direction of the gear; and a switching device operative for reversing the direction of rotation of said electric motor when said wiping element reaches the respective limits of said wiping angle, including a direction-reversing switch having contact elements interposed in said electric circuit, and two switch-actuating pins spaced from one another by an angle corresponding to said wiping angle and operative for actuating said switch, said pins being mounted on said output gear for joint rotation therewith and at least one of said pins being insertable into any one of said holes to permit adjustment of the circumferential distance between said pins and thereby of said wiping angle.

2. An arrangement as defined in claim 1, wherein said transmission is a reduction transmission.

3. An arrangement as defined in claim 1, wherein said output gear of said transmission is formed as a spoked wheel having elastic spokes.

4. An arrangement as defined in claim 3, wherein said spoked wheel has a remainder portion, said spokes and said remainder portion of said wheel being constituted by a synthetic plastic material and being of one piece with one another.

5. An arrangement for wiping a vehicle window, comprising a wiping element adapted to pivot through a predetermined wiping angle; an electric motor having a circuit and a rotatable motor shaft; a transmission driven by said motor shaft and having a housing and an output shaft on which said wiping element is mounted; an output gear also mounted on said output shaft of said transmission for joint movement therewith; and a switching device operative for reversing the direction of rotation of said electric motor when said wiping element reaches the respective limits of said wiping angle, including a direction-reversing switch mounted on said housing and having a casing provided with two diametrically opposite holes, contact elements interposed in said circuit, two switch-actuating pins connected with said output gear for rotation with the same and being spaced from one another by an angle corresponding to said wiping angle, a switching cam extending into the path of movement of said switch-actuating pins, and two guiding pins connected with said cam and located diametrically opposite one another in the switching direction of said direction-reversing switch and slidable in said diametrically opposite holes.

6. An arrangement as defined in claim 5, wherein said holes are blind and so dimensioned that said guiding pins move in said holes substantially without play.

7. An arrangement as defined in claim 5, wherein said direction-reversing switch further has a connecting plate which connects said switching cam with said guiding pins.

8. An arrangement as defined in claim 7, wherein said contact elements of said direction-reversing switch have two movable contacts and two parts of immovable contacts, each of said movable contacts being located between a respective one of said pairs of immovable contacts and is connected with said connecting plate.

9. An arrangement as defined in claim 5; and further comprising a wiping end switch which includes a contact disc mounted on said output shaft of said transmission for joint rotation therewith, said contact disc having a contact track which extends through an angle at least equal to the angle between said switch-actuating pins of said direction-reversing switch and has an insulated recess, said wiping end switch further having two sliding contact elements which contact said contact track of said contact disc and one of which runs in said recess when said wiping element and said contact disc are in a normal position.

10. An arrangement as defined in claim 9, wherein one of said switch-actuating pins is so located that in the normal position of said wiping element and said contact disc it engages with said switching cam.

* * * * *